(12) United States Patent
Molz et al.

(10) Patent No.: US 8,421,004 B2
(45) Date of Patent: Apr. 16, 2013

(54) NUCLEAR DETECTORS BUILT DIRECTLY INTO SHIELDING OR MODULATING MATERIAL

(75) Inventors: Eric B. Molz, Houston, TX (US);
Hayward Atkinson, Houston, TX (US);
Qianmei Zhang, Katy, TX (US);
Constantyn Chalitsios, Houston, TX (US); Srdja Zekovic, Houston, TX (US);
Edgar R. Alvarez, Houston, TX (US);
Jonathan Hook, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 303 days.

(21) Appl. No.: 12/797,876

(22) Filed: Jun. 10, 2010

(65) Prior Publication Data

US 2010/0314536 A1 Dec. 16, 2010

Related U.S. Application Data (60) Provisional application No. 61/186,597, filed on Jun. 12, 2009.

(51) Int. Cl.
*G01V 5/06* (2006.01)
(52) U.S. Cl.
USPC .................. 250/254; 250/253; 250/269.4
(58) Field of Classification Search .................. 250/254
See application file for complete search history.

(56) References Cited

U.S. PATENT DOCUMENTS

| | | | | |
|---|---|---|---|---|
| 4,524,324 A * | 6/1985 | Dickinson, III | ............ | 340/856.3 |
| 4,661,700 A | 4/1987 | Holenka | | |
| 4,760,252 A * | 7/1988 | Albats et al. | ............. | 250/390.07 |
| 4,879,463 A * | 11/1989 | Wraight et al. | ............ | 250/269.2 |
| 5,235,185 A * | 8/1993 | Albats et al. | ................ | 250/269.5 |
| 5,250,806 A * | 10/1993 | Rhein-Knudsen et al. | ... | 250/254 |
| 5,251,708 A * | 10/1993 | Perry et al. | ........................ | 175/41 |
| 5,349,184 A * | 9/1994 | Wraight | ........................ | 250/266 |
| 5,397,893 A * | 3/1995 | Minette | .......................... | 250/254 |
| 5,525,797 A * | 6/1996 | Moake | ........................ | 250/269.3 |
| 5,608,215 A | 3/1997 | Evans | | |
| 5,789,752 A * | 8/1998 | Mickael | ...................... | 250/269.5 |
| 6,207,953 B1 * | 3/2001 | Wilson | ........................ | 250/269.4 |
| 7,148,471 B2 * | 12/2006 | Roscoe et al. | ............. | 250/269.2 |
| 7,151,254 B2 * | 12/2006 | Mickael | ....................... | 250/269.3 |
| 7,634,059 B2 * | 12/2009 | Wraight | .......................... | 378/89 |
| 7,787,933 B2 * | 8/2010 | Iwanczyk et al. | ............. | 600/425 |
| 7,960,687 B1 * | 6/2011 | Simon et al. | ................ | 250/269.1 |
| 8,076,634 B2 * | 12/2011 | Stoller | ....................... | 250/269.1 |
| 2006/0054803 A1 | 3/2006 | Labous et al. | | |
| 2006/0178577 A1 * | 8/2006 | Iwanczyk et al. | ............. | 600/425 |
| 2009/0057545 A1 * | 3/2009 | Saenger et al. | ............ | 250/269.4 |

(Continued)

OTHER PUBLICATIONS

Notification of Transmittal of the International Search Report and the Written Opinion of the International Searching Authority, or the Declaration; PCT/US2010/038174; Dec. 31, 2010.

*Primary Examiner* — David Porta
*Assistant Examiner* — Djura Malevic
(74) *Attorney, Agent, or Firm* — Cantor Colburn LLP (57) ABSTRACT

An apparatus for measuring radiation in a borehole penetrating the Earth, the apparatus includes: a downhole tool having a structure defining a cavity; and one or more radiation detection components integrated into the cavity and configured to measure the radiation. An apparatus conveyable through a borehole for measuring radiation downhole and a method of producing a downhole apparatus for measuring radiation are provided.

17 Claims, 6 Drawing Sheets

U.S. PATENT DOCUMENTS

2009/0283691 A1* 11/2009 Stoller .................. 250/390.1
2010/0193675 A1* 8/2010 Stoller .................... 250/254
2011/0198488 A1* 8/2011 Stoller et al. ............ 250/258
2011/0238313 A1* 9/2011 Thornton et al. ............ 702/8

* cited by examiner

NUCLEAR DETECTORS BUILT DIRECTLY INTO SHIELDING OR MODULATING MATERIAL

CROSS-REFERENCE TO RELATED APPLICATIONS AND PRIORITY CLAIM

This application claims the benefit of U.S. Provisional Application Ser. No. 61/186,597, entitled "NUCLEAR DETECTORS BUILT DIRECTLY INTO SHIELDING OR MODULATING MATERIAL", filed Jun. 12, 2009, under 35 U.S.C. §119(e), which is incorporated herein by reference in its entirety.

BACKGROUND OF THE INVENTION

1. Field of the Invention

The invention disclosed herein relates to radiation detectors, and in particular to radiation detectors integrated with downhole tools useful for evaluating sub-surface materials.

2. Description of the Related Art

Current techniques used for exploration and production of hydrocarbons call for performing various types of subterranean surveys. In order to complete such surveys, a borehole is typically drilled into the earth and through sub-surface materials that make up geologic formations.

Well logging is used to perform measurements of properties of the sub-surface materials penetrated by the borehole. Generally, a logging tool is attached to or included within a drill string. The drill string rotates to turn a rotary cutting device used to provide the borehole. In one embodiment, referred to as "logging-while-drilling," the logging tool is used to perform the measurements during drilling or during a temporary halt in drilling.

Various types of measurements can be performed using such a logging tool. In general, various types of radiation sources (such as a pulsed neutron generator (PNG), a neutron source, a chemical source (e.g., a Cs-137 source), and other such sources) may be included in the logging tool or drill string to create particular types of radiation fields downhole. Some embodiments of logging tools simply monitor ambient radiation and are therefore "sourceless." These logging tools all include some form of radiation detection equipment.

Common to each type of radiation detection instrumentation used in logging tools are various structural components. For example, a housing may be provided which contains the detection instrumentation and in turn lets manufacturers load the instrumentation into the logging equipment. Protection elements, such as suspension or vibration dampening components, as well as insulation and the like, may be included. As one might surmise, including housing and other components can lead to scatter and attenuation of radiation signals thereby reducing the performance of the detection instrumentation. Further, shielding of background radiation may be required by the measurement and not be provided by the housing, insulation, and suspension systems.

BRIEF SUMMARY OF THE INVENTION

Disclosed is an apparatus for measuring radiation in a borehole penetrating the Earth, the apparatus includes: a downhole tool having a structure defining a cavity; and one or more radiation detection components integrated into the cavity and configured to measure the radiation.

Also disclosed is an apparatus for measuring radiation in a borehole penetrating the Earth, the apparatus includes: a carrier configured to be conveyed through the borehole; a downhole tool coupled to the carrier and having a structure defining a cavity; and one or more radiation detection components integrated into the cavity and configured to measure the radiation.

Further disclosed is a method for producing an apparatus for measuring radiation in a borehole penetrating the Earth, the method includes: selecting a downhole tool having a structure defining a cavity therein; and integrating one or more radiation detection components into the cavity.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

The teachings herein provide for radiation detector elements integrated with tooling for performing downhole surveys of sub-surface materials. Generally, the radiation detector elements include improved designs that result in uncomplicated and robust instrumentation useful in a while-drilling environment. Further, the designs provide improved data when compared to results obtained using prior art technologies.

First, some definitions are provided for clarity. As discussed herein, the term "formation" and other similar terms generally refer to sub-surface materials that are located within a survey volume. That is, a "formation" is not limited to geologic formations as such, and may generally include any materials found downhole. Also, as discussed herein, a "radiation detector" may include any type of an active, radiation sensitive material, which is generally contained or monitored for indication of interaction with radiation. The radiation detector may be a composite of materials, such as use of scintillator materials in combination with a photo-multiplier tube (PMT). The term "survey radiation" is adopted as a matter of convention, and to indicate an origin of radiation, and not to be considered a type of radiation.

Further, the term "integrated" as used herein with reference to embodiments of detectors within logging tools, makes reference to incorporation of aspects of a given detector into a given logging tool. For example, an integrated gas-filled radiation detector may be a radiation detector that is fabricated by machining directly into a component of a drill string, such as a section of a drill collar. In this example, a manufacturer may then incorporate an anode, which is insulated from the machined section of the drill collar, to form a gas-filled radiation detection chamber. The section may also be fabricated such that it serves as well as shielding for the detector, as described further herein. In short, an "integrated detector" does not include many of the components of traditional radiation detection equipment. As another example, the integrated detector does not include a separate housing that houses radiation detection components as in a traditional radiation detector. Rather, one or more of the radiation detection components use a section or structure of a downhole tool itself, into which the components are integrated, as a housing or supporting structure. As another example, one of more of the radiation detection components use a section or structure of the downhole tool itself as an integral part of the radiation detection component. As described above, a gas-filled radiation detection chamber may be machined into a section or structure of the downhole tool. The section or structure thus forming an integral part (i.e., pressure boundary) of the gas-filled radiation detector chamber.

Figure 1:
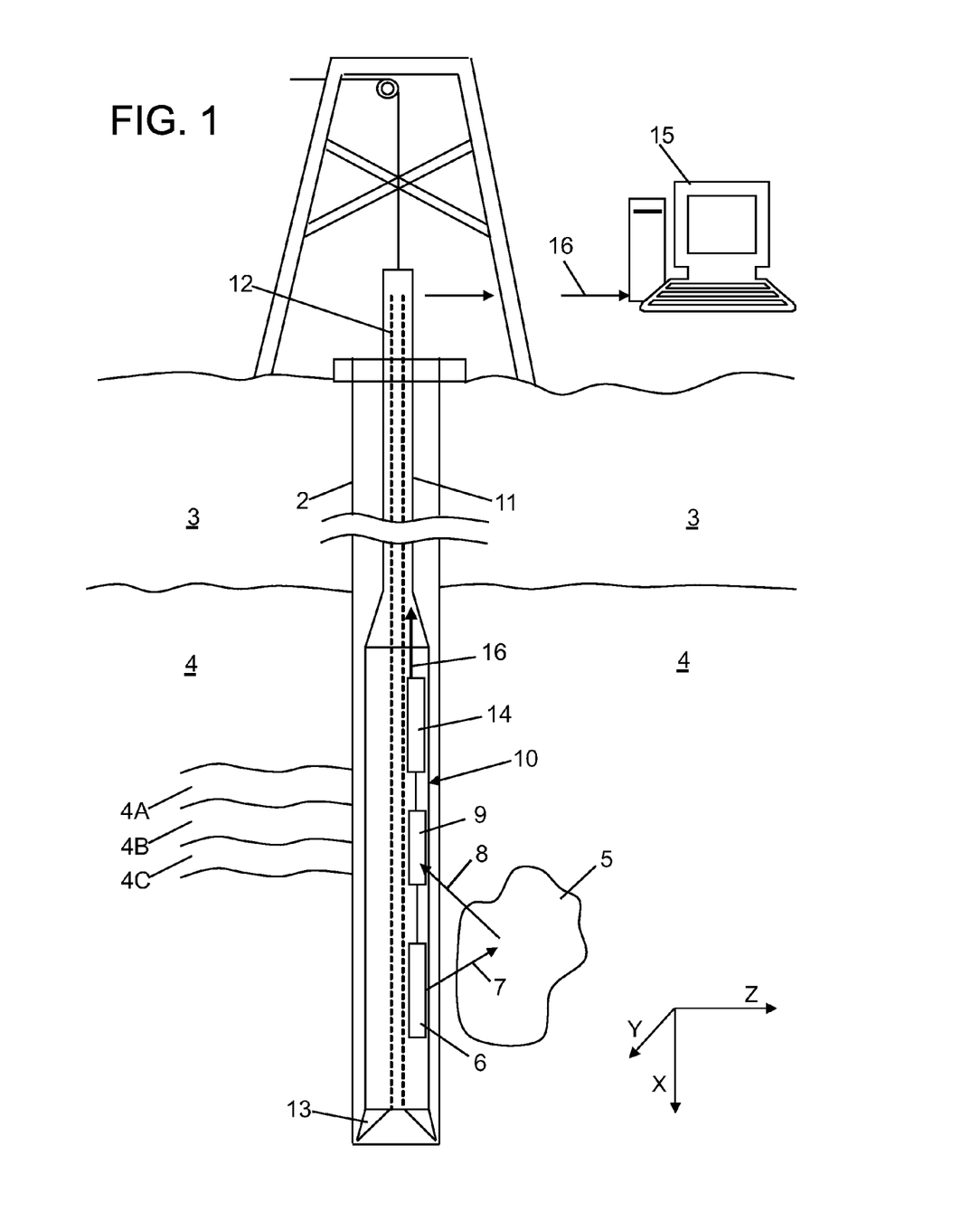
FIG. 1 illustrates an exemplary embodiment of a logging tool disposed in borehole penetrating an earth formation.

Reference may now be had to FIG. 1. FIG. 1 illustrates an exemplary embodiment of a logging tool (or downhole tool) 10 disposed in a borehole 2 penetrating the Earth 3. The Earth 3 includes an earth formation 4, which includes layers 4A-4C. In the embodiment of FIG. 1, the logging tool 10 is configured for logging-while-drilling (LWD) or measurement-while-drilling (MWD) applications. As such, the logging tool 10 is disposed in a collar at the distal end of drill string 11. Logging may be performed during drilling or during a temporary halt. In other embodiments, the logging tool 10 may be configured to be conveyed through the borehole 2 by a wireline, a slickline, coiled tubing, a tractor, or by other techniques as may be known in the art.

During drilling operations, drilling mud may be pumped from the surface of the Earth 3 through a mud channel 12 in the drill string 11 to a cutting device 13 for lubrication and cooling. The drilling mud is discharged from the distal end of the drill string 11 into the borehole 2. The drilling mud returns to the surface through the borehole 2, carrying away debris from the cutting operations.

In the embodiment of FIG. 1, the logging tool 10 is configured with a radiation source 6. The radiation source 6 emits radiation 7 into a region of investigation 5 in the formation 4.

Survey radiation 8 is then produced in the region of investigation 5 and detected by at least one radiation detector 9. That is, in some embodiments, a portion of the radiation 7 is scattered back to the logging tool 10 as the survey radiation 8. In other embodiments, neutrons interact in the formation, and activate at least a portion of the sub-surface materials. Accordingly, the survey radiation 8 may include radiation produced by activation of materials within the region of investigation 5.

The logging tool 10 may includes an electronics unit 14 that is coupled to the detector 9. The electronics unit 14 provides various functionality. For example, the electronics unit 14 may be configured with a power supply and the like for operating the detector 9. The electronics unit 14 may receive and/or analyze measurement data from the radiation detector 9. Exemplary sub-components on board the electronics unit 14 include a pre-amplifier, an amplifier, a battery, a transformer, a rectifier, an inverter, a single channel analyzer, a multi-channel analyzer, memory, storage, a processor, an interface, a communications link, and the like.

Data 16 associated with the measurements can be recorded by the electronics unit 14 and/or transmitted to a processing system 15 disposed on the surface of the Earth 3 (above the borehole 2). When the data 16 is recorded, the data 16 can be stored for later retrieval when the logging tool 10 is removed from the borehole 2. A telemetry system can be used for transmitting the data 16 to the processing system 15. Non-limiting examples of techniques the telemetry system uses to transmit the data 16 include pulsed-mud, wired drill pipe, acoustic, optical, and electromagnetic.

The processing system 15 receives and processes the data 16 to estimate a property of the formation 4. Non-limiting examples of the property include porosity and a location of a boundary between formation layers 4A-4C. In general, the property is presented to a drilling operator or petroanalyst to optimize drilling or formation analysis.

The radiation detector 9 may include any type of radiation detector 9 that is deemed useful downhole. For example, the detector 9 may include a semi-conductor type, a scintillator, a gas filled detector, and various other types of detectors suited for use downhole. Of course, each detector includes various features and aspects unique to that type of detector, hence, the various types of detectors 9 are, at least to some extent, unique from each other. Accordingly, one skilled in the art will understand how to adapt the various types of detectors according to the teachings herein.

Figure 2A:
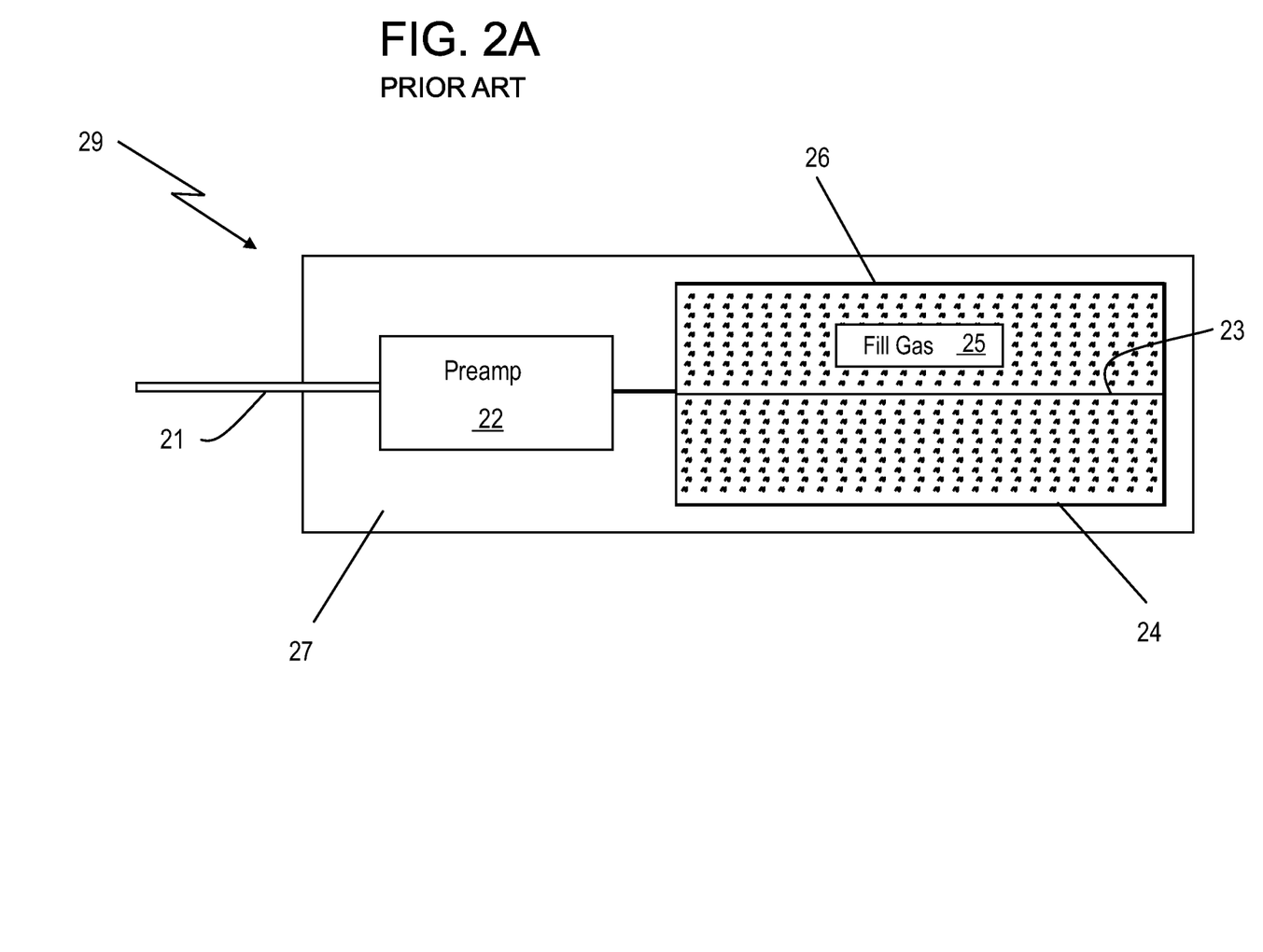
FIG. 2A and FIG. 2B, collectively referred to herein as FIG. 2, depict aspects of a prior art gas filled detector and logging tool, respectively.
Figure 2B:
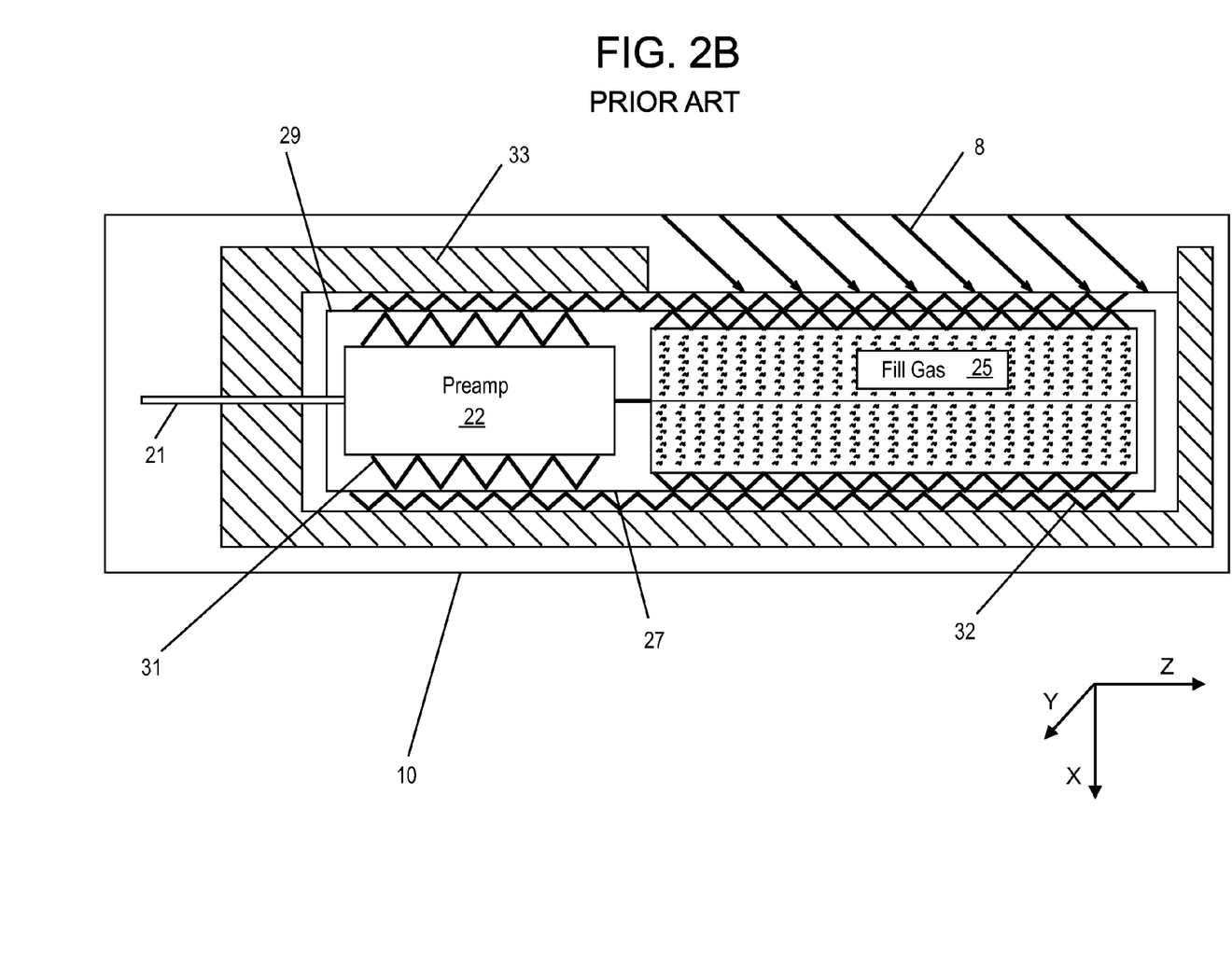

Referring now to FIG. 2, there are shown aspects of a prior art implementation of a gas-filled radiation detector 9. In FIG. 2A, aspects of a stand-alone gas-filled detector 29 are shown. Generally, in this embodiment, the gas filled detector 29 includes a preamplifier 22 which is coupled to a detector body 26. The detector body 26 includes an outer portion, such as an annular housing, which is sealed and may serve as a cathode 24. Disposed along a center axis of the annular housing is a wire. The wire is electrically insulated from the cathode 24 and serves as an anode 23. When a voltage is applied, radiation interactions in fill gas 25 result in an electrical signal. Generally, the signal is amplified in the preamplifier 22 and sent to the electronics unit 14 via a cable 21. Generally, the stand-alone gas-filled detector 29 is packaged in a housing 27. Generally, the housing is fabricated from stainless steel or similar materials. An installation of the stand-alone gas-filled detector 29 is shown in FIG. 2B.

In the illustration provided in FIG. 2B, the gas filled radiation detector 29 is disposed in the logging tool 10. In order to accommodate the harsh environment downhole, an internal suspension structure 31 and an external suspension structure 32 are included. Generally, the internal suspension structure 31 and the external suspension structure 32 provide for absorption of vibration during the drilling process, and therefore provide protection to delicate elements, such as the anode 23. As one can see, the use of the housing 27 is redundant once the detector 29 is in place.

In this example, the internal suspension structure 31 consumes space and does not block or modulate radiation. Likewise, the external suspension structure 32 consumes space and does not block or modulate radiation. The design provided includes shielding or modulating material that surrounds the detector 29, while leaving a path to the gas filled tube.

As is known in the art, the radiation detector 29 is generally surrounded by shielding 33. The shielding 33 is used to limit interference of background radiation which may include radiation that has travelled through the tool and mud rather than formation with the survey radiation 8. Generally, the shielding 33 provides for at least one of attenuation of gamma radiation, absorption of charged particles, and moderation of neutron radiation. Accordingly, the shielding 33 may be fabricated of dense materials (such as lead), hydrogenous materials (such as high temperature plastics) and composites of various materials.

Figure 3:
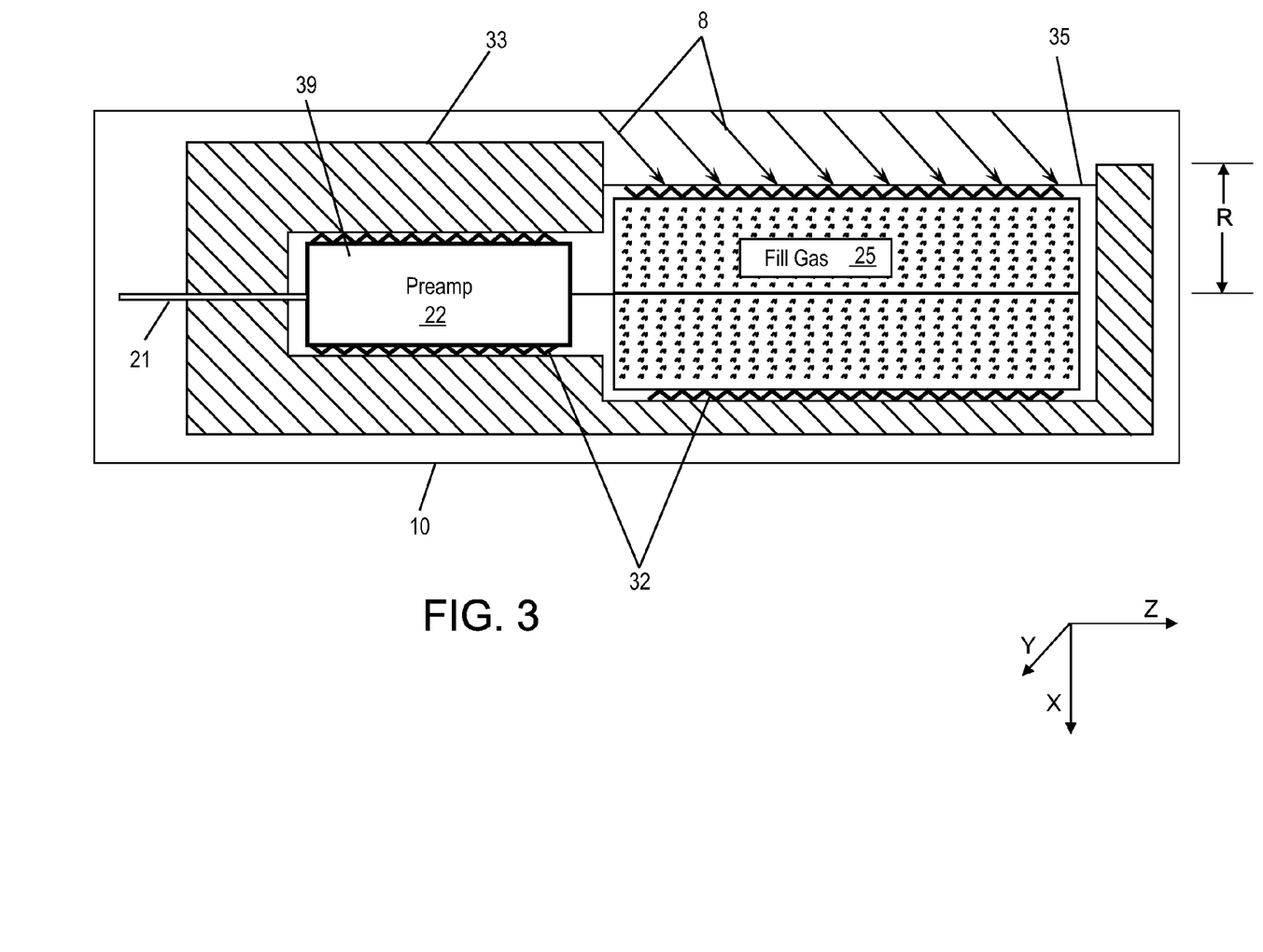
FIG. 3 depicts an embodiment of a logging tool according to the present invention, wherein a gas filled detector is deployed in the tool.

Referring to FIG. 3, the logging tool 10 fabricated according to the invention herein includes a gas-filled integrated radiation detector 39. The integrated radiation detector 39 is disposed within shielding 33 included within the tool 10.

Generally, the detector volume including the fill gas 25 is disposed behind a window 35. The window 35 is included to protect the detector 39 from the downhole environment.

In this example, the detector 39 does not include the housing 27 used in the prior art. Accordingly, the preamplifier 22 and gas tube (having the fill gas 25) mount directly into the shielding 33 (or "modulating material," depending on the application). Thus, the removal of at least one suspension system provides space in the logging tool 10 for use of a larger gas tube (i.e., tube with a greater radius, R), thus improving detector response. Further, locating the tube closer to the outer diameter of the tool 10 also improves detector response by reducing attenuation of the incident survey radiation 8.

In some embodiments, of the integrated radiation detector 39, a detector tube is built directly into material used to form the shielding 33. Examples include shielding 33 that is fabricated from tungsten (for gamma rays) or boron (for neutrons).

Figure 4A:
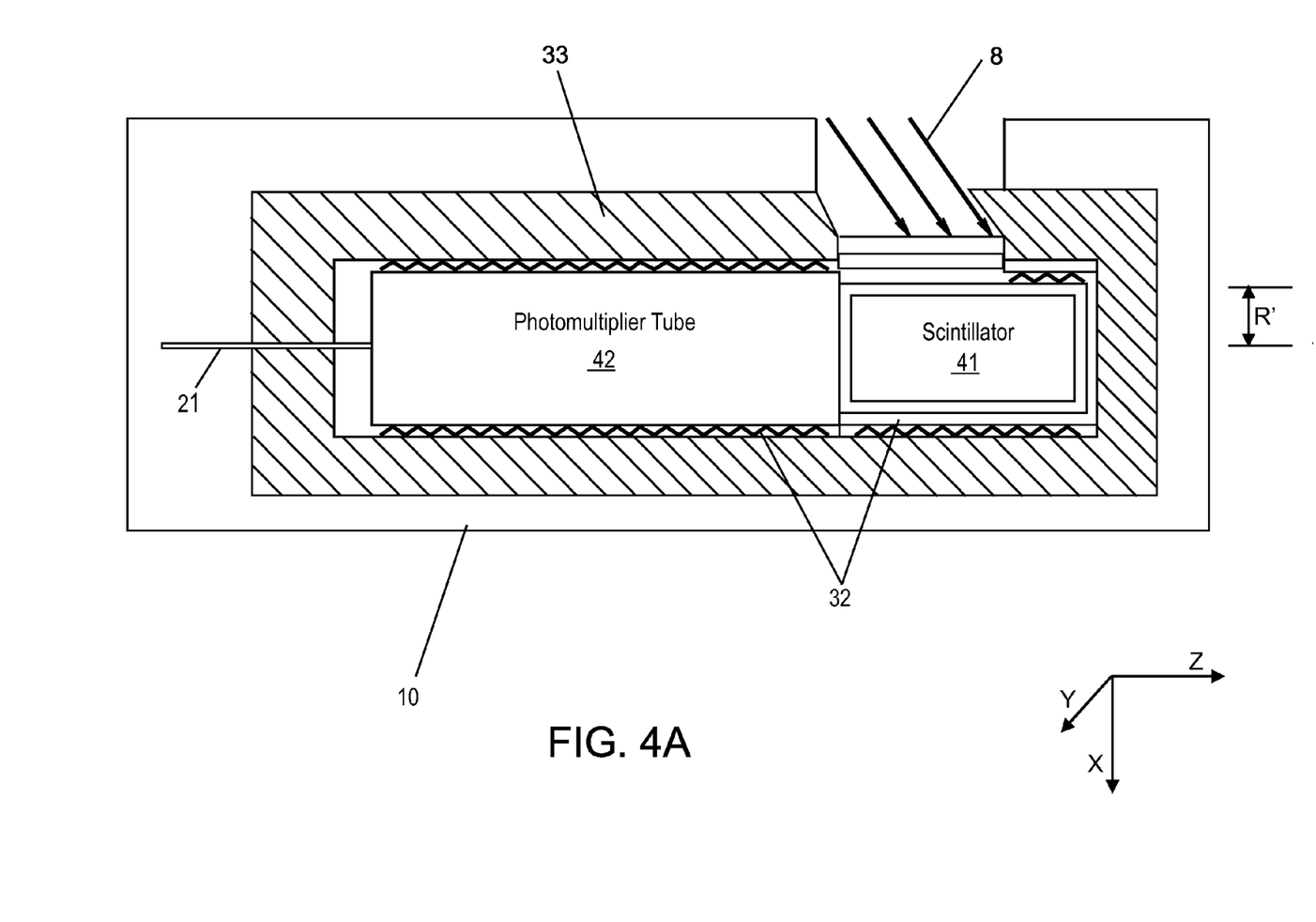
FIG. 4A and FIG. 4B, collectively referred to herein as FIG. 4, depict embodiments of a logging tool according to the present invention, wherein a scintillation based detector is deployed in the tool.
Figure 4B:
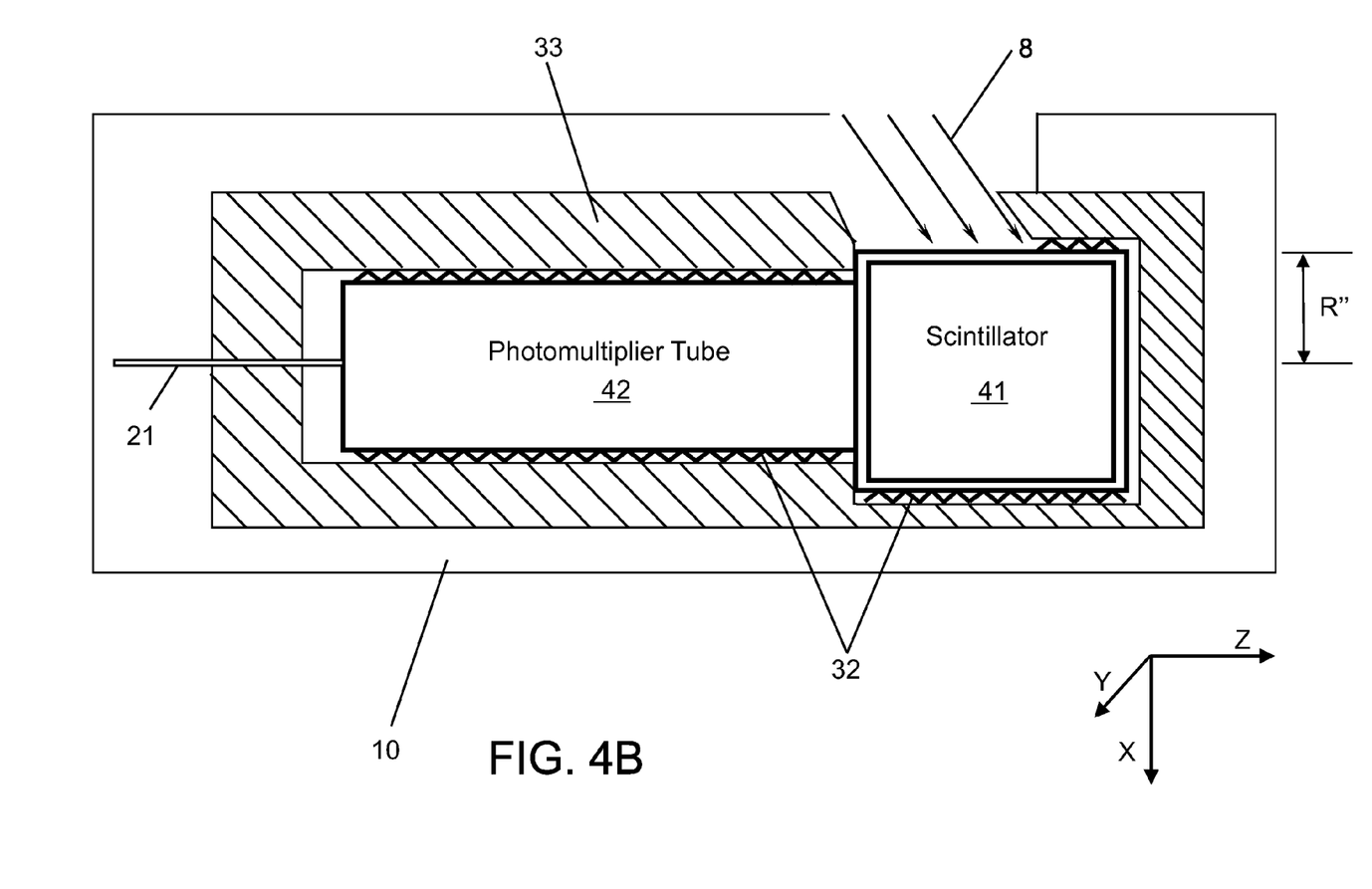

FIG. 4 provides an illustration of the integrated radiation detector 39 which includes a scintillator 41. In FIG. 4A, the scintillator 41 includes a shorter radius, R', while in FIG. 4B, the scintillator 41 includes a greater radius, R". As one can understand from the illustrations, dispensing with the use of prior art housings 27 allows manufacturers to better customize and adapt a shape, a size, and other such characteristics so that each detector may be better integrated with the logging tool 10.

Having thus described aspects of the logging tool 10 including an integrated radiation detector, aspects of additional embodiments are provided. In some embodiments, the shielding 33 serves as the cathode, and includes insulators disposed therein for providing the anode. The shielding may be formed in such a manner as to provide a contoured cradle for carrying components of the detector (such as the preamplifier). The integrated radiation detector may be fabricated with other specifications in mind, such as with environmental controls (e.g., providing a sealed chamber to protect hygroscopic components).

With regard to integrated gas filled radiation detectors, such detectors may be operated in any region of the gas ionization curve. That is, the integrated gas filled radiation detector may be operated in an ionization region, a proportional region, a Geiger-Mueller region, or any other region (i.e., voltage) deemed appropriate by a user. Accordingly, fill gas for the integrated gas filled radiation detector may also include any gas, or combination of gases deemed appropriate by a user. Exemplary fill gas includes, without limitation, helium-3, xenon, mixtures of argon and methane, and the like.

Among other things, advantages of the present teachings include: more shielding/modulating material; a capability to increase the dimensions of the radiation sensitive material (gas or scintillator); a capability to position the radiation sensitive material more preferably within the tool; and a capability to create a more focused radiation window to allow the entrance of desired radiation.

With regard to integrated scintillation detectors, such detectors may also be operated at any voltage deemed appropriate by a user. Accordingly, scintillators for use in the logging tool 10 may include any scintillator, or combination of scintillators, which exhibit a property of luminescence when excited by ionizing radiation (directly or indirectly), and are deemed appropriate by a user. Scintillator materials may include, without limitation, materials that are any one an organic crystal, an organic liquid, a plastic, an inorganic crystal, a gaseous material or a glass. Exemplary scintillators include, by way of non-limiting example, NaI, NaI(Tl), Li-6, BGO, LaHa, CsI(Tl), CsI(Na), CsI(pure), CsF, KI(Tl), LiI (Eu), $BaF_2$, $CaF_2(Eu)$, ZnS(Ag), $CaWO_4$, $CdWO_4$, YAG(Ce), $Y_3Al_5O_{12}$(Ce), GSO, LSO, $LaCl_3$(Ce) (lanthanum chloride doped with Cerium), $LaBr_3$(Ce) (a Cerium-doped lanthanum bromide) and the like.

It should be understood that the integrated radiation detectors 39 provided herein are merely illustrative and are not limiting. For example, other types of integrated radiation detectors 39 may be had, such as, a semi-conductor based detector adapted for high-temperature environments. Integrated radiation detectors 39 according to the teachings herein may be adapted to detect alpha, beta, gamma, neutron radiation, and any suited combinations.

In support of the teachings herein, various analysis components may be used, including a digital system and/or an analog system. The system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), a cooling component, a heating component, a controller, an optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slicklines, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for measuring radiation in a borehole penetrating the Earth, the apparatus comprising:
   a downhole tool;
   shielding disposed in the downhole tool and comprising a structure defining a cavity; and
   a plurality of radiation detection components integrated into the cavity and configured to measure the radiation;
   wherein:
   the shielding is configured to shield each of two longitudinal ends of the cavity;
   the shielding forms a contoured cradle for carrying each radiation detection component in the plurality of radiation detection components;
   the shielding completely shields at least one radiation detection component in the plurality of radiation detection components radially about a longitudinal axis; and
   the shielding forms a housing for the plurality of radiation detection components.

2. The apparatus as in claim 1, wherein the shielding material comprises at least one of lead, tungsten, boron, a hydrogenous material, and a composite thereof.

3. The apparatus as in claim 1, wherein the shielding material comprises a window configured to admit the radiation.

4. The apparatus as in claim 1, wherein the plurality of radiation detection components include a gas-filled detector and a preamplifier.

5. The apparatus as in claim 4, wherein a fill gas for the gas-filled detector comprises at least one of helium-3, xenon, argon, methane and a mixture of gases.

6. The apparatus as in claim 1, wherein the plurality of radiation detection components include a scintillator and a photomultiplier tube.

7. The apparatus as in claim 6, wherein the scintillator comprises at least one of NaI, NaI(Tl), Li-6, BGO, LaHa, CsI(Tl), CsI(Na), CsI(pure), CsF, KI(Tl), LiI(Eu), $BaF_2$, $CaF_2(Eu)$, ZnS(Ag), $CaWO_4$, $CdWO_4$, YAG(Ce) $Y_3Al_5O_{12}$ (Ce), GSO, LSO, LaCl3(Ce) and LaBr3(Ce).

8. The apparatus as in claim 1, wherein the structure is electrically insulated from a remaining portion of the downhole tool.

9. The apparatus as in claim 1, further comprising an interface to an electronics unit.

10. The apparatus as in claim 1, wherein a suspension structure is disposed directly between the cavity formed by the shielding and the plurality of radiation detection components.

11. The apparatus as in claim 1, wherein the cavity forms a pressure boundary for a fill gas configured to provide an electrical signal upon interacting with the radiation.

12. An apparatus for measuring radiation in a borehole penetrating the Earth, the apparatus comprising:
    a carrier configured to be conveyed through the borehole;
    a downhole tool coupled to the carrier;
    shielding disposed in the downhole tool and comprising a structure defining a cavity; and
    a plurality of radiation detection components integrated into the cavity and configured to measure the radiation;
    wherein:
    the shielding is configured to shield each of two longitudinal ends of the cavity;
    the shielding forms a contoured cradle for carrying each radiation detection component in the plurality of radiation detection components;
    the shielding completely shields at least one radiation detection component in the plurality of radiation detection components radially about a longitudinal axis; and
    the shielding forms a housing for the plurality of radiation detection components.

13. The apparatus as in claim 12, further comprising an electronics unit for operating one or more of the radiation detection components in the plurality of radiation detection components.

14. The apparatus as in claim 12, further comprising an electronics unit for analyzing a signal from one or more of the radiation detection components in the plurality of radiation detection components.

15. The apparatus as in claim 12, further comprising at least one of a pre-amplifier, an amplifier, a battery, a transformer, a rectifier, an inverter, a single channel analyzer, a multi-channel analyzer, memory, storage, a processor, an interface and a communications link for supporting one or more radiation detection components in the plurality of radiation detection components.

16. The apparatus of claim 12, wherein the carrier comprises at least one of a wireline, a slickline, a drill string, and coiled tubing.

17. A method for producing an apparatus for measuring radiation in a borehole penetrating the Earth, the method comprising:
    selecting a downhole tool comprising shielding having a structure defining a cavity therein and being configured to shield each of two longitudinal ends of the cavity; and
    integrating one or more radiation detection components into the cavity;
    wherein:
    the shielding is configured to shield each of two longitudinal ends of the cavity;
    the shielding forms a contoured cradle for carrying each radiation detection component in the plurality of radiation detection components;
    the shielding completely shields at least one radiation detection component in the plurality of radiation detection components radially about a longitudinal axis; and
    the shielding forms a housing for the plurality of radiation detection components.

* * * * *